United States Patent [19]
Floyd

[11] Patent Number: 5,142,825
[45] Date of Patent: Sep. 1, 1992

[54] HAND-HELD ELONGATED STOCK MATERIAL CUTTER

[76] Inventor: Kenneth R. Floyd, 21 Tweed Rd., Fox Lake, Ill. 60020

[21] Appl. No.: 691,487

[22] Filed: Apr. 25, 1991

[51] Int. Cl.⁵ .................. B24B 9/00; B24B 23/02; B23D 21/06; B26D 3/16
[52] U.S. Cl. .................. 51/5 C; 51/170 PT; 51/181 NT; 30/102; 30/123; 7/157
[58] Field of Search ........... 51/5 C, 98 R, 281 P, 51/289 R, 290, 323, 326, 327; 30/92, 92.5, 93, 94, 95, 97, 101, 102, 103, 105, 123, DIG. 1; 7/157, 158

[56] References Cited

U.S. PATENT DOCUMENTS

| | | | |
|---|---|---|---|
| H45 | 4/1986 | Gilmore | 30/92 |
| 3,449,992 | 6/1969 | Hanaway . | |
| 3,583,106 | 6/1971 | Dobbertin | 30/123 |
| 3,834,019 | 9/1974 | Smeltzer et al. . | |
| 3,858,317 | 1/1975 | Ford et al. . | |
| 4,349,928 | 9/1982 | Mlikotin . | |
| 4,625,464 | 12/1986 | Kubo . | |

Primary Examiner—Bruce M. Kisliuk
Assistant Examiner—Bo Bounkong
Attorney, Agent, or Firm—Fleit, Jacobson, Cohn, Price, Holman & Stern

[57] ABSTRACT

An elongated portable frame is provided including front and rear ends and a mid-length laterally outwardly projecting tubular handle for containing a battery pack. The front end of the frame journals a saw blade therefrom and the saw blade is driven by an electric motor supported from the frame. A pair of rearwardly retractable jaws are disposed on opposite sides of the forward periphery of the saw blade and are opposed by a rearwardly retractable jaw structure disposed forwardly of the forward limit positions of movement of the jaw members and an actuator for the jaw structure is disposed immediately forward of the handle for engagement and rearward displacement by the forefinger of a hand encircling the handle, whereby the jaw structure may be shifted rearwardly to initially clamp a work piece to be cut between the jaws and the jaw structure and thereafter utilized to rearwardly advance the work piece to be cut relative to the saw blade. The rear of the frame journals rearwardly facing inner and outer conical grinding stones for outwardly and inwardly beveling, respectively, cut ends of tubular work pieces severed by the saw blade.

18 Claims, 3 Drawing Sheets

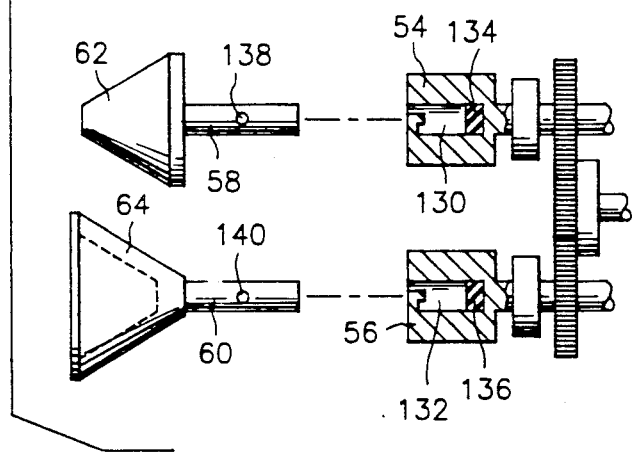
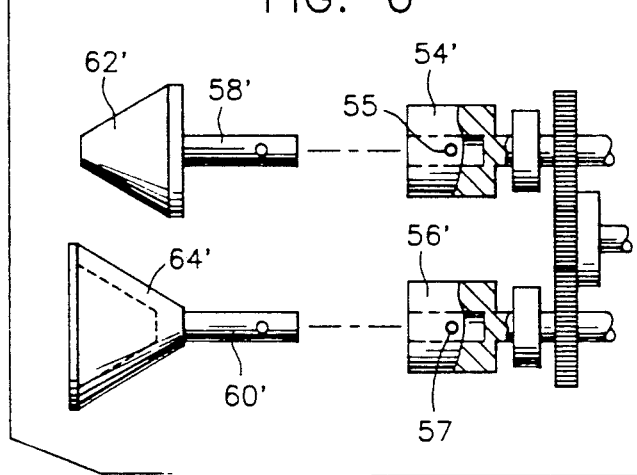
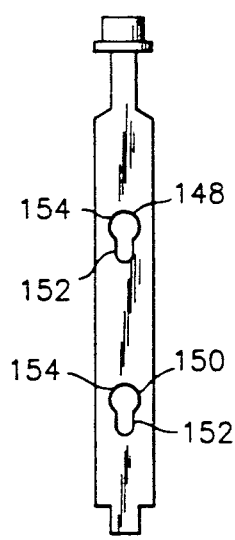
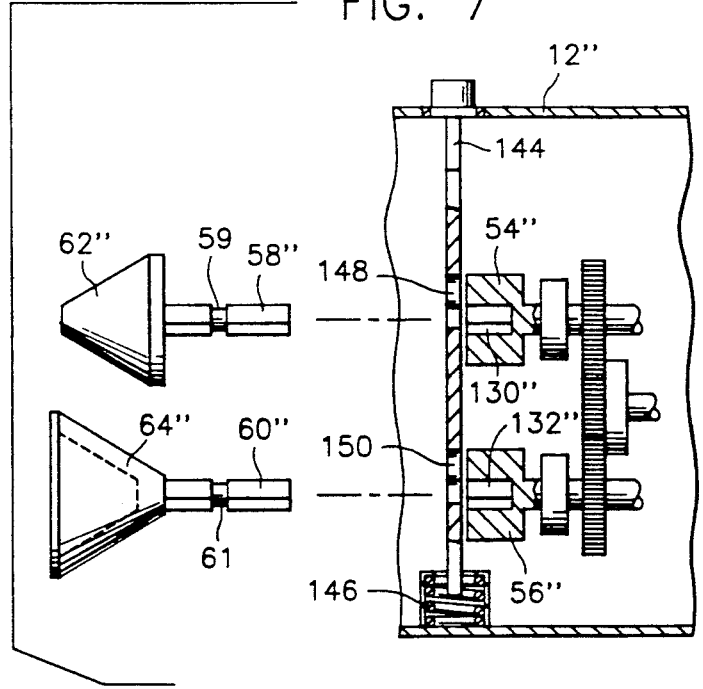

HAND-HELD ELONGATED STOCK MATERIAL CUTTER

BACKGROUND OF THE INVENTION

1. Field of the Invention

This invention relates to a portable, hand-held cutter which may, by the use of only one hand, if necessary, be engaged with and utilized to cut a piece of elongated stock such as metal or plastic tubing as well as solid stock material. In addition, the same tool may be used to form an inside bevel or an outside bevel, or both, on the cut end of a piece of cylindrical stock.

2. Description of Related Art

Various different forms of pipe cutters including some of the general structural and operational features of the instant invention heretofore have been provided such as those disclosed in U.S. Pat. Nos: 3,449,992, 3,834,019, 3,858,317, 4,349,928 and 4,625,464. However, these previously known forms of pipe cutting devices do not include the overall combination of structural features incorporated in the instant invention.

SUMMARY OF THE INVENTION

The hand-held tool of the instant invention utilizes an electric motor as a power source and in that form of the invention disclosed the motor is battery powered. However, the electric motor could be replaced by a fluid motor or an electric motor to be driven by electric utility supplied electric current.

In addition, the tool includes a basic configuration not unlike that of a pistol grip-type of electric drill whereby it may readily handled and operated by a single hand of the user and the pistol grip includes, in operative association therewith, a pair of triggers, both of which must be actuated to operate the motor of the tool. A first trigger, preferably to be actuated by the forefinger of the user's hand encircling the handle of the tool, is operatively associated with (1) a first jaw assembly movable toward and away from the outer periphery of a circular grinding or saw blade driven by the electric motor from a position spaced outward from the outer periphery of the blade and (2) a first switch for actuating the motor of the tool. The second trigger is disposed on the rear side of the handle and is actuatable by the user tightly gripping the handle of the tool. The second trigger is operatively associated with a second switch connected in series with the first switch in a manner such that both switches (or valves in the case of a fluid actuated motor) must be actuated in order to effect operation of the cutter motor. In addition to the first jaw assembly being movable toward and away from the outer periphery of the circular blade along a diametric plane thereof, a second jaw assembly incorporating a pair of jaws mounted closely on opposite sides of the circular blade is provided and the pair of jaws are independently mounted for shifting along the aforementioned diametric plane between extended and retracted positions and are disposed immediately outward of the outer periphery of the circular blade and open radially outwardly therefrom along the aforementioned diametric plane when in the extended positions.

Still further, the rear end of the tool remote from the jaw assemblies thereof includes a pair of driven shafts having exterior and interior rearwardly facing conical grinding or cutting members coupled thereto whereby cut ends of cylindrical stock may be internally or externally beveled, as desired, or beveled both internally and externally.

The main object of this invention is to provide a hand-held elongated stock material cutter of the portable type and which may be utilized by mechanics in various trades for cutting elongated stock material in an efficient and accurate manner.

Another very important object of this invention is to provide a single hand operable, portable and hand-held elongated stock material cutter which may be utilized to cut various types of elongated stock material with a minimum amount of effort on the part of the mechanic utilizing the cutter and with the desired cuts being made in a minimum amount of time.

Yet another object of this invention is to provide a cutter for cutting tubing and which also includes structure by which the cut end of a length of tubing may be beveled internally and/or externally.

A final object of this invention to be specifically enumerated herein is to provide a hand-held elongated stock material cutter in accordance with the preceding objects and which will conform to conventional forms of manufacture, be of simple construction and easy to use so as to provide a device that will be economically feasible, long-lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 5 is an schematic exploded side elevational view of the two rear driven chucks of the invention with the external and internal conical grinding stones or cutters in exploded positions relative thereto, the chucks including portions broken away and illustrating the bayonet type of connection provided thereby;

FIG. 6 is schematic, exploded side elevational view similar to that of FIG. 5 and illustrating a second form of chuck incorporating set screws;

FIG. 7 is a schematic exploded horizontal view illustrating a third form of chuck incorporating non-circular sockets and grinding stone shanks and having a keyhole type slide operatively associated therewith for releasably retaining the associate stone shanks respective sockets; and FIG. 8 is a side elevational view of the keyhole equipped slide illustrated in FIG. 7.

DETAILED DESCRIPTION OF THE PREFERRED EMBODIMENTS

Figure 1:
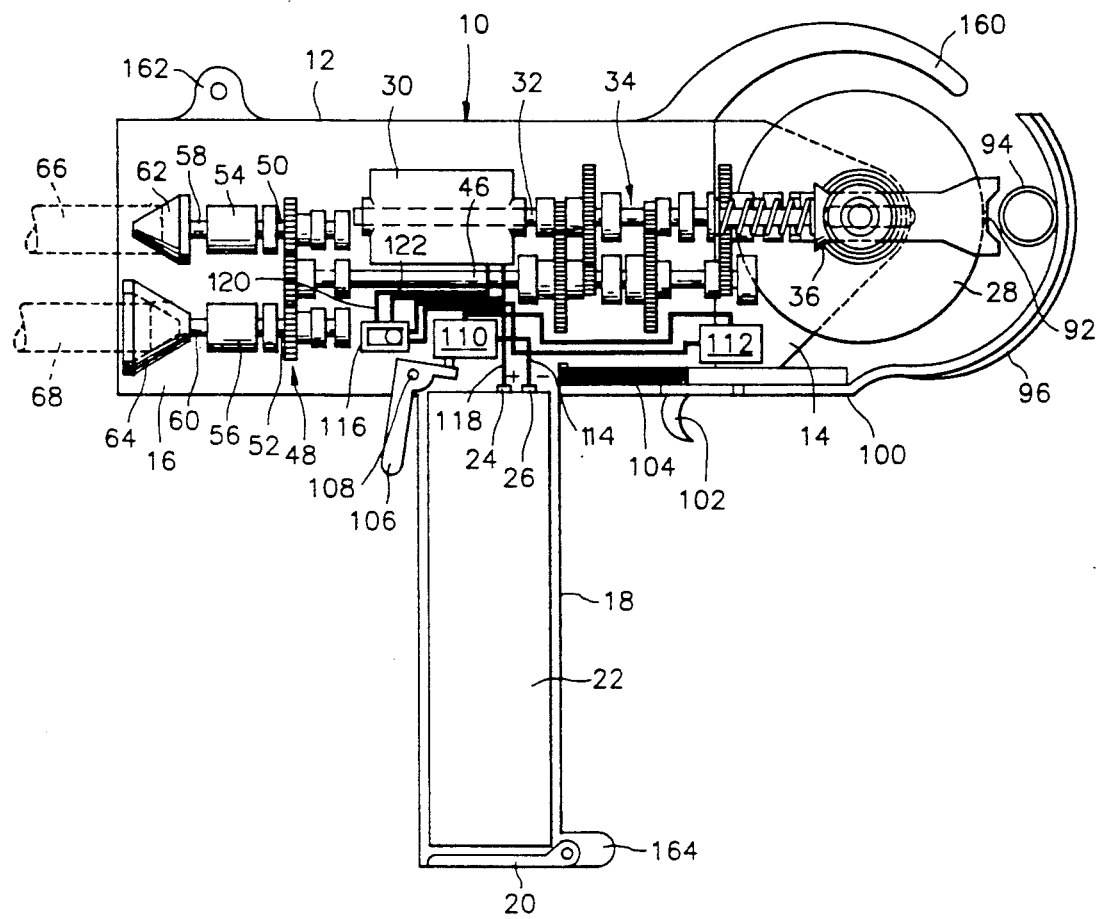
FIG. 1 is a schematic side elevational view of a cutter constructed in accordance with the present invention wherein the cutter is of the battery powered type and with a pair of tubular stock cut ends illustrated in phantom lines operatively associated with the external and internal conical bevel producing stones or cutters at the rear of the cutter.
Figure 2:
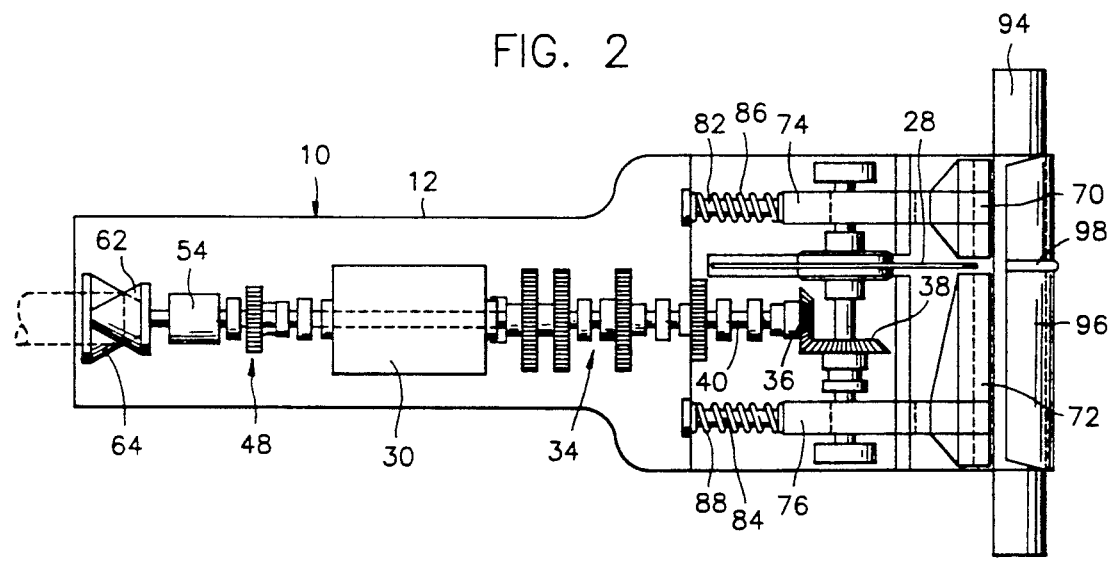
FIG. 2 is a schematic top plan view of the assemblage illustrated in FIG. 1.

Referring now more specifically to the drawings the numeral 10 generally designates a stock material cutter including a portable frame or housing 12. The housing 12 is elongated and includes front and rear ends 14 and 16 as well as a laterally outwardly directed hollow handle 18 mounted from the frame 1 generally centrally intermediate its opposite ends in order that the weight of the components supported within the frame 12 is generally equally distributed to the front and rear of the handle 18.

The outer end of the handle 18 includes an openable door 20 enabling an elongated battery pack 22 to be inserted and releasably retained within the handle 18, the battery pack 22 including electrical current output terminals 24 and 26.

The front end 14 of the housing 12 rotatably journals an abrasive or toothed circular saw blade 28 therefrom and the interior of the housing 12 mounts a high speed electric motor 30 therein including a rotary output shaft 32 drivingly connected to the blade 28 through a speed reducing gear train referred to in general by the reference numeral 34 and a pair of bevel gears 36 and 38, the bevel gear 36 being mounted on the output shaft 40 of the gear train 34 and the bevel gear 38 being mounted on the transverse support shaft for the blade 28 journaled from the forward end 14 of the frame 12 through the utilization of suitable bearings 44. The specific structure of the gear train 34 is unimportant, it only being necessary that the gear train be capable of driving the output shaft 40 at a speed considerably lower than the speed of rotation of the shaft 32.

The gear train 34 also includes a driven jack shaft 46 which in turn drives a second gear train referred to in general by the reference numeral 48 and the gear train 48 drives a pair of rear accessory drive shafts 50 and 52 having a pair of chucks 54 and 56, respectively, supported therefrom. The chucks 54 and 56 removably drivingly support the shanks 58 and 60 of external and internal conical grinding stones or cutters 62 and 64, respectively. The rear of the frame or housing 12 includes openings (not shown) through which cut ends of pipe sections 66 and 68 may be inserted for engagement with the stones or cutters 62 and 64 as will be hereinafter more fully set forth.

In addition to the blade 28 being journaled from the forward end 14 of the housing 12, a pair of laterally extending jaw members 70 and 72 are supported closely adjacent and on opposite sides of the forward peripheral portion of the blade 28. The jaw members 70 and 72 include shank portions 74 and 76, respectively, extending longitudinally of the frame 12 and provided with elongated slots 78 and 80 through which the corresponding ends of the shaft 42 are rotatably and slidably received. The rear ends 82 and 84 of shanks 74 and 76 are diametrically reduced and have compression springs 86 and 88 disposed thereabout which function to yieldingly bias the jaw members 70 and 72 forwardly from their rearmost limit positions illustrated in FIGS. 3 and 4 drawings toward their forwardmost limit positions illustrated in FIG. 1 of the drawings. The jaw members 70 and 72 open forwardly outwardly of the forwardmost outer periphery of the blade 28 when the jaw members 70 and 72 are in their forwardmost limit positions illustrated in FIG. 1 and the jaw members 70 and 72 include forwardly opening notches 90 and 92 formed therein in which a cylindrical piece of stock material 94 may be cradled and steadied.

The jaw members 70 and 72 are opposed by a rearwardly opening arcuate jaw 96 which is elongated transversely of the frame or housing 12 and of a total length greater than total length of the jaw members 70 and 72. The jaw 96 includes a longitudinal central portion 98 in the plane of the blade 28 including an inner side groove for receiving the outer periphery of the blade 28 therein. The jaw 96 is supported by a central rearwardly projecting arm 100 slidably mounted from the frame 12 in any convenient manner for reciprocation longitudinally thereof and an index finger engagable trigger 102 is connected to the arm 100 whereby the index finger of a persons hand encircling the handle 18 may be utilized to rearwardly displace the trigger 102 and thus the jaw 96 relative to the jaw members 70 and 72, a compression spring 104 being operatively connected between the frame 12 and the arm 100 or trigger 102 yieldingly biasing the jaw 96 to its forwardmost limit position illustrated in FIG. 1.

The housing 12 additionally includes a second trigger 106 pivotally supported from the housing 12 as at 108 and disposed immediately behind the upper end of the handle 18. The trigger 106 is operatively associated with a switch 110 and a further switch 112 is operatively associated with the trigger 102. The switches 110 and 112 are serially connected in a conductor 114 extending from the terminal 26 to a reversing switch 116 and a second conductor extends for the terminal 24 to the reversing switch 116, conductors 120 and 122 extending from the reversing switch 116 to the motor 30.

The switches 110 and 112 are normally open and the switch 110 is closed by counter clockwise angular displacement of the trigger 106 from the position thereof illustrated in FIG. 1 while the switch 112 is closed by initial rearward displacement of the trigger 102 from the fowardmost limit position thereof illustrated in FIG. 1.

Accordingly, the motor 30, which is reversable, is inoperable until both triggers 102 and 106 have been actuated and actuation of the trigger 102 not only closes the switch 112, but rearwardly shifts the jaw 96 from the forwardmost limit position thereof illustrated in FIG. 1 to a position with the stock 94 clamped between the jaw 96 and the jaw members 70 and 72. At this point, the motor may be actuated by the user of the cutter 10 tightening his grip about the handle 18 in order to angularly displace the trigger 106 in a counter clockwise direction from the position thereof illustrated in FIG. 1 thus causing the motor 30 to be actuated and the blade 28 to be driven. Thereafter, further rearward displacement of the trigger 102 relative to the handle 18 causes the jaw 96 to move the stock 94 rearwardly against the biasing action of the springs 86, 88 in order to "feed" the stock 94 into engagement with the blade 28. When the jaw 96 has been shifted to the fully rearwardly displaced position thereof illustrated in FIG. 3, the cut by the saw blade 28 through the stock 94 has been completed and the two cut apart sections of the stock 94 remain clamped between the jaw 96 and the jaw members 70 and 72 until rearward pressure on the trigger 102 has been released. Thus, it may be seen that the stock 94 may be cut through utilization of the cutter 10 while the latter is being supported and actuated by only one hand of the user.

With attention now invited more specifically to FIG. 5, it may be seen that the chucks 54 and 56 include bayonet-type connection sockets 130 and 132 for receiving the shanks 58 and 60 of the stones or cutters 62 and 64, the inner ends of the sockets 130 and 132 being provided with blocks 134 and 136 of resilient material whereby the radial pins 138 and 140 carried by the shanks 58 and 60 may be removably retained within the sockets 130 and 132.

With attention now invited more specifically to FIG. 6, there will be seen modified chucks 54' and 56' in which the shanks 58' and 60' of stones or cutters 62' and 64' corresponding to the stones or cutters 62 and 64 may be removably secured through the utilization of set screws 55 and 57 carried by the chucks 54' and 56'. Further, with attention now more specifically to FIG. 7, a third form of stones or cutters are designated by the reference numerals 62" and 64" and the shanks thereof are designated by the reference numeral 58" and 60", respectively. The shanks 58" and 60" are non-circular in cross section and are receivable in corresponding chucks 54" and 56" having complimentary non-circular recesses 130" and 132". In addition, the shanks 58" and 60" are provided with intermediate length circumferential grooves 59 and 61 and a retainer slide plate 144 is mounted from the frame 12" for vertical movement and is yieldingly biased toward an uppermost limit position by a compression spring 146, the plate 144 having a pair of keyhole-shaped openings 148 and 150 therein including narrow width lower portions 152 and wider width upper portions 154. When the plate 144 is downwardly displaced from the position thereof illustrated in FIG. 7 with the narrow width lower portions 152 of the openings 148 and 150 registered with the sockets 130" and 132", the shanks 58" and 60" may be received through the wider width upper portions 154 of the openings 148 and 150 for reception within the sockets 130" and 132". Then, when downward pressure on the plate 144 is released, the spring 146 upwardly displaces the plate 144 to its uppermost limit position illustrated in FIG. 7 in order that the narrow width lower portions 152 of the openings 148 and 150 will lock the shanks 58" and 60" within the sockets 130" and 132", those portions of the plate 144 defining the narrow width lower portions 152 of the openings 148 and 150 being disposed in the grooves 59 and 61 to prevent axial shifting of the shanks 58" and 60" relative to the chucks 54" and 56".

Figure 3:
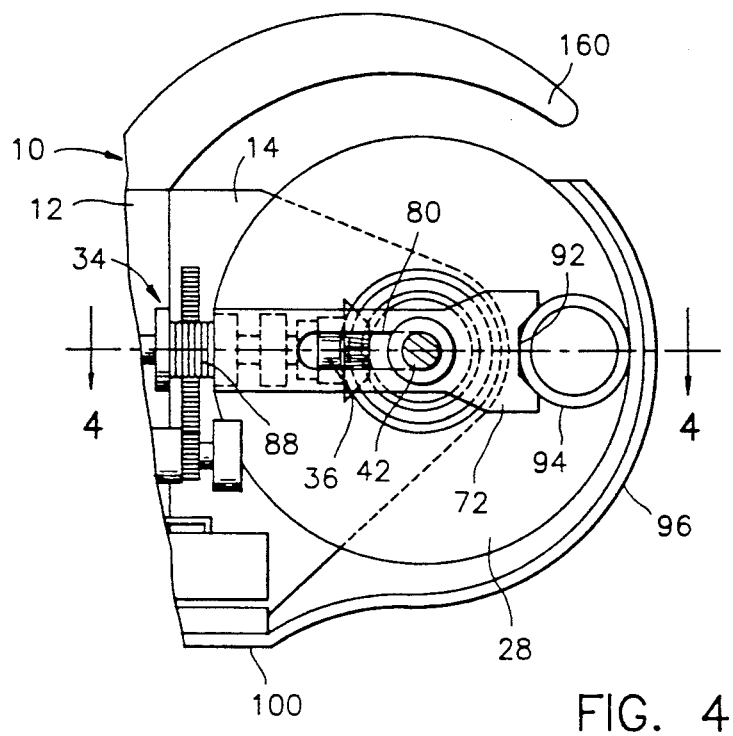
FIG. 3 is an enlarged schematic side elevational view of the right hand portion of FIG. 1 illustrating the manner in which the relatively shiftable components of the cutter are positioned at the of a cutting operation.
Figure 4:
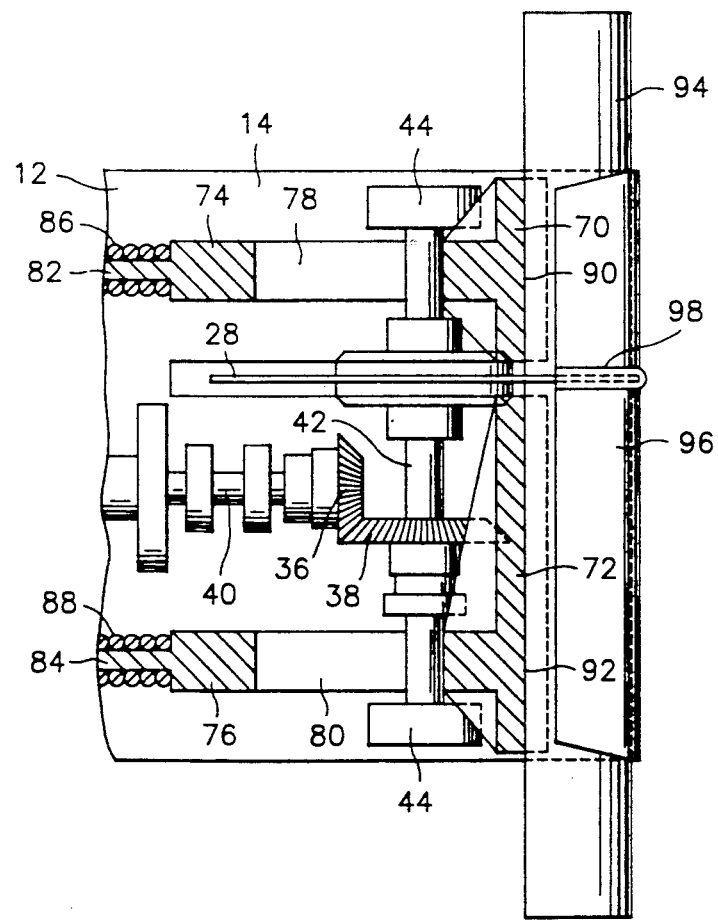
FIG. 4 is a horizontal sectional view taken substantially upon the plane indicated by the section line 4—4 of FIG. 3.

After the stock 94 has been cut in the manner illustrated in FIGS. 3 and 4, the cut ends of the resultant two pieces of stock 94 each may be either internally beveled by the stone or cutter 62 or externally beveled by the stone or cutter 64 merely by inserting the cut ends of the stock 94 represented by the phantom lines in FIG. 1 and designated by the reference numerals 66 and 68 through the openings (not shown) in the rear of the frame or housing 12 and into contact with the stones or cutters 62 and 64. Of course, the same beveling action may be carried out by the stones or cutters 62' and 64' as well as the stones or cutters 62" and 64".

The upper portion of the forward end 14 of the housing 12 includes an arcuate guard 160 disposed over and about the upper peripheral portion of the blade 28, but the throat between the free end of the guard 160 and the free end of the jaw 96 is sufficiently wide to receive the stock 94 therethrough. If desired, the tool 10 may be modified by trimming the free end of the jaw 96 and the forwardmost position of the jaw 96 illustrated in FIG. 1 may be even further forwardly displaced in order to enable the cutter 10 to cut larger diameter stock. The apertured ear 162 carried by the rear upper portion of the housing 12 is provided to enable the cutter 10 to be hung from a belt and the forward projection 164 at the lower end of the handle 18 is provided to prevent a work person's hand from slipping from the handle 18.

In addition to the cutter 10 being capable of cutting tubular stock (either plastic or metal), it is also envisioned that other cross sectional shape stock including solid stock may be readily cut by use of the cutter 10.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A tool for cutting elongated stock including an elongated portable frame having opposite ends and opposite sides, a motor mounted from said frame, a circular saw blade journaled from one end of said frame for rotation about a predetermined axis and including an outer periphery, drive means drivingly coupling said motor to said saw blade, a pair of first jaw means mounted from said frame and closely spaced on opposite sides of the plane of said saw blade for movement between extended and retracted limit positions in paths at least substantially disposed in a diametric plane of and containing said axis and with said first jaw means disposed and facing outwardly of said outer periphery when in said extended positions and shifted inwardly toward said axis when in said retracted positions, first biasing means connected between said frame and first jaw means yielding biasing said first jaw means toward said extended positions, second jaw means shiftably mounted from said frame and including portions spaced outwardly of said outer periphery, disposed on both sides of said plane of said saw blade and facing toward and opposing said first jaw means with said second jaw means portions being shiftable toward and away from said outer periphery and said first jaw means generally along said diametric plane, second biasing means yieldingly biasing said second jaw means away from said outer periphery, said frame including a handle for hand support of said frame and operable hand digit engagable first actuating means shiftably supported from said frame remote from said blade, engagable by a digit of hand engaged with said handle and operatively connected with said second jaw means for shifting said second jaw means toward said outer periphery against the biasing action of said second biasing means.

2. The tool of claim 1 wherein said second jaw means includes saw periphery clearance means to allow said second jaw means to shift toward said outer periphery sufficiently to enable elongated stock clamped between said first and second jaw means to be completely cut through by said saw blade.

3. The tool of claim 1 wherein said first biasing means exerts a greater force on said first jaw means than the force exerted on said second jaw means by said second biasing means.

4. The tool of claim 1 wherein said handle comprises an elongated pistol grip-type of handle projecting lengthwise outwardly from one of said sides of said frame, said first actuating means comprising a trigger-type actuator disposed laterally outwardly of one longitudinal side of said frame shiftable toward and away from said handle and engagable by at least one finger of hand engaged about said handle.

5. The tool of claim 4 including second actuating means shiftably supported from said frame for movement between active and inactive positions and yieldingly biased toward said inactive position on the side of said handle opposite from said first actuating means and adapted to be shifted from said inactive position to said active position responsive to tightening of hand disposed about said handle, said motor comprising an electric motor including a control circuit therefore incorporating a normally open control switch operatively associated with said second actuating means for closing of said control switch responsive to movement of said second actuating means to said active position.

6. The tool of claim 5 including a second normally open control switch serially connected in said control circuit and operatively associated with said trigger type actuator for closing said second control switch upon movement of said second jaw means toward said outer periphery.

7. The tool of claim 1 wherein said first and second jaw means define work engaging and cradlingly recesses opening toward each other for engaging and cradling elongated stock disposed therebetween extending transverse to said plane of said saw blade.

8. The tool of claim 1 wherein said handle comprises an elongated handle projecting lengthwise outwardly from one of said sides of said frame and said handle is hollow for removably receiving an elongated battery pack therein, said motor comprising an electric motor, and circuit means electrically connected to said motor and including contact portions thereof electrically engagable with contact terminals of a battery pack inserted in said handle.

9. The tool of claim 1 wherein said elongated handle projects laterally outwardly of said frame generally centrally intermediate the opposite ends thereof.

10. The tool of claim 9 wherein the end of said frame opposite from said one end with the circular saw blade includes outwardly facing rotary external and internal conical grinding stones or cutters means drivingly connecting said motor to said grinding stones or cutters.

11. The tool of claim 10 wherein said grinding stones or cutters are removably supported from chucks journaled from the end of said frame opposite from said one end of said frame, said stones or cutters including support shanks removably supported from said chucks.

12. The tool of claim 11 wherein said shanks and chucks include coacting bayonet connection means for removably supporting said shanks from said chucks.

13. The tool of claim 11 wherein said chucks define outwardly opening sockets in which the free ends of said shanks are received, said chucks including set screws removably securing said shanks in said sockets.

14. The tool of claim 11 wherein said chucks define outwardly opening non-circular sockets, said shanks being of noncircular cross section and telescopingly received within said sockets against rotation therein, said shanks projecting outwardly from said sockets and including circumferential grooves formed therein, the grooved portions of said shanks passing through keyhole openings formed in a retaining plate mounted from said frame for reciprocal movement along a path normal to said shanks and disposed in a plane containing the axis of rotation of said chucks, said plate being yieldingly bias toward a position with the grooved portions of said shanks received in the narrow width portions of said keyhole openings.

15. A tool for cutting elongated stock including an elongated portable frame having opposite ends, a motor mounted from said frame, a circular saw blade journaled and projecting radially outwardly from one end of said frame and including an outer periphery, drive means drivingly coupling said motor to said saw blade, a pair of first jaw means mounted from said one end of said frame for independent shifting longitudinally of said frame generally along a diametric plane of said saw blade and with said first jaw means disposed closely adjacent opposite sides of said saw blade, said first jaw means being shiftable between extended and retracted positions relative to said outer periphery of said saw blade, first biasing means yieldingly biasing said first jaw means toward said extended positions, second jaw means mounted from said frame for movement longitudinally thereof and disposed outwardly of and opposing said first jaw means, said second jaw means being shiftable between and outward limit position spaced outwardly from the extended positions of said first jaw means and inward limit position at least closely adjacent said outer periphery of said saw blade, second biasing means yieldingly biasing said second jaw means toward said outward limit position, said frame including an elongated handle lengthwise projecting laterally outwardly of said frame intermediate said opposite ends, said second jaw means including an actuator therefore engagable by a finger of a hand encircling said handle for shifting said actuator and thus said second jaw means rearwardly relative to said frame.

16. The tool of claim 15 wherein said second jaw means includes saw periphery clearance means to allow said second jaw means to shift toward said inwardmost limit position sufficiently to enable elongated stock clamped between said first jaw means and said second jaw means to be completely cut through by said saw blade.

17. The tool of claim 16 wherein said first biasing means exerts a greater force on said first jaw means members than the force exerted on said second jaw means by said second biasing means.

18. A tool for cutting elongated stock including an elongated portable frame having opposite ends and opposite sides, a motor mounted from said frame, a circular saw blade journaled from one end of said frame for rotation about a predetermined axis and including an outer periphery, drive means drivingly coupling said motor to said saw blade, a pair of first jaw means mounted from said frame and closely spaced on opposite sides of the plane of said saw blade for movement between extended and retracted limit positions in paths at least substantially disposed in a diametric plane of and containing said axis and with said first jaw means disposed and facing outward of said outer periphery when in said extended positions and shifted inwardly toward said axis when in said retracted positions, first biasing means connected between said frame and said first jaw means yieldingly biasing said first jaw means toward said extended positions, second jaw means shiftably mounted from said frame and including portions spaced outward of said outer periphery, disposed on both sides of said plane of said saw blade and facing toward and opposing said first jaw means with said second jaw means portions being shiftable toward and away from said outer periphery and said first jaw means generally along said diametric plane, second biasing means yieldingly biasing said second jaw means away from said outer periphery, said frame including hand operable first actuating means shiftable supported from said frame remote from said blade and operably connected with said second jaw means for shifting said second jaw means toward said outer periphery against the biasing action of said second biasing means.

* * * * *